(12) United States Patent
Banerjee

(10) Patent No.: US 10,754,861 B2
(45) Date of Patent: Aug. 25, 2020

(54) SYSTEM AND METHOD FOR CONTENT AFFINITY ANALYTICS

(71) Applicant: Tata Consultancy Services Limited, Mumbai (IN)

(72) Inventor: Sujoy Banerjee, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 660 days.

(21) Appl. No.: 15/418,324

(22) Filed: Jan. 27, 2017

(65) Prior Publication Data

US 2018/0101535 A1 Apr. 12, 2018

(30) Foreign Application Priority Data

Oct. 10, 2016 (IN) .............................. 201621034707

(51) Int. Cl.
| | |
|---|---|
| *G06F 16/2457* | (2019.01) |
| *G06F 16/28* | (2019.01) |
| *G06F 16/901* | (2019.01) |
| *G09B 5/06* | (2006.01) |
| *G09B 7/00* | (2006.01) |

(52) U.S. Cl.
CPC ...... *G06F 16/24578* (2019.01); *G06F 16/284* (2019.01); *G06F 16/9024* (2019.01); *G09B 5/065* (2013.01); *G09B 7/00* (2013.01)

(58) Field of Classification Search
CPC ........... G06F 16/24578; G06F 16/9024; G06F 16/284; G09B 5/065; G09B 7/00
USPC .................................................. 707/748, 798
See application file for complete search history.

(56) References Cited

U.S. PATENT DOCUMENTS

| | | | |
|---|---|---|---|
| 7,014,467 B2 | 3/2006 | Krebs et al. | |
| 7,512,612 B1 | 3/2009 | Akella et al. | |
| 7,933,915 B2 | 4/2011 | Singh et al. | |
| 9,348,947 B2* | 5/2016 | Stetson | G06F 16/24566 |
| 2006/0059054 A1* | 3/2006 | Adiseshan | G06Q 10/04 705/26.7 |
| 2006/0265508 A1* | 11/2006 | Angel | H04L 29/12047 709/230 |
| 2007/0033221 A1* | 2/2007 | Copperman | G06F 16/367 707/999.103 |
| 2009/0253112 A1* | 10/2009 | Cao | G06Q 10/10 434/322 |
| 2011/0077972 A1* | 3/2011 | Breitenstein | G16H 10/60 705/3 |

(Continued)

*Primary Examiner* — Phong H Nguyen
(74) *Attorney, Agent, or Firm* — Finnegan, Henderson, Farabow, Garrett & Dunner LLP

(57) ABSTRACT

Method and system for content affinity analytics using graph and exchange of affined learning data across learning management systems (LMS), are provided. The present invention relates to a method and system for performing content affinity analytics in learning management systems such as assessment management systems (AMS)/content management systems (CMS)/learning management system (LMS). The present invention comprises of a data capture service layer, affinity analysis layer and an information retrieval layer. The data capture service Layer models the data management entities into a connected graph. The affinity analysis layer identifies the affinity data and creates/updates the relations among the nodes. Further, the information retrieval layer exposes APIs which queries the graph and returns data in a JSON format.

15 Claims, 10 Drawing Sheets

(56) References Cited

U.S. PATENT DOCUMENTS

| | | | |
|---|---|---|---|
| 2013/0022953 A1* | 1/2013 | van der Linden | G09B 7/02 |
| | | | 434/322 |
| 2013/0283138 A1* | 10/2013 | Tao | G06F 16/94 |
| | | | 715/205 |
| 2015/0033106 A1* | 1/2015 | Stetson | G06F 16/248 |
| | | | 715/215 |
| 2015/0099254 A1* | 4/2015 | Kamimaeda | G09B 7/08 |
| | | | 434/322 |
| 2015/0170536 A1 | 6/2015 | Lan et al. | |
| 2015/0302300 A1* | 10/2015 | Fletcher | G06N 5/04 |
| | | | 706/11 |
| 2016/0180248 A1* | 6/2016 | Regan | G09B 5/00 |
| | | | 706/12 |
| 2016/0189444 A1* | 6/2016 | Madhok | G07C 5/02 |
| | | | 701/36 |
| 2017/0061320 A1* | 3/2017 | Fuchs | G06N 20/00 |
| 2017/0083571 A1* | 3/2017 | Shankar | G06F 16/24575 |
| 2018/0082183 A1* | 3/2018 | Hertz | G06K 9/6259 |
| 2018/0096105 A1* | 4/2018 | Bleicher | G06Q 50/22 |

* cited by examiner

SYSTEM AND METHOD FOR CONTENT AFFINITY ANALYTICS

PRIORITY CLAIM

This U.S. patent application claims priority under 35 U.S.C. § 119 to: India Application No. 201621034707, filed on Oct. 10, 2016. The entire contents of the aforementioned application are incorporated herein by reference.

TECHNICAL FIELD

The embodiments herein relate to content affinity and more particularly to system and method for content affinity analytics.

BACKGROUND

While content is pervasive in any AMS/CMS/LMS, however the method of extracting insights about reusability/togetherness of content is not available in existing LMS/CMS/AMS. What is also missing is a method/technique to predict the degree of reuse or togetherness of the content in future usages. Currently systems exist where content categorization and searching is done in more of a streamlined fashion; however the reusability study and predictive study has not been done so far on these systems. On top of it, there does not exist any system/protocol through which such reuse/togetherness data can be exchanged between two AMS/CMS/LMSs.

In a related existing solution there is a description of a method for tracing variation of concept knowledge of learners over time and evaluating content organization of learning resources used by the learners. The method jointly traces latent learner concept knowledge and simultaneously estimates the quality and content organization of the corresponding learning resources (such as textbook sections or lecture videos), and the questions in assessment sets. The prior art further discloses a block multi-convex optimization-based algorithms that estimate all the learner concept knowledge state transition parameters of learning resources and question-concept associations and their intrinsic difficulties. This prior work mainly focuses on the course content evolutions over time after analyzing learners' outcomes.

Another prior art discloses a method for analyzing, querying, and mining graph databases using sub graph and similarity querying. The prior art describes a tree-based index called Closure-tree, or C-tree. Each node in the tree contains discriminative information about its descendants in order to facilitate effective pruning. This summary information is represented as a graph closure, a "bounding box" of the structural information of the constituent graphs. The C-tree supports both subgraph queries and similarity queries on various kinds of graphs. The graph closures capture the entire structure of constituent graphs, which implies high pruning rates.

Another solution provides a relationship graph of nodes representing entities and edges representing relationships among the entities is searched to find a match on search criteria, such as an individual or a company. This solution uses a graph database as it provides best performance for such type of analytics.

Another solution provides an e-learning system and methodology structures content so that the content is reusable and flexible. For example, the content structure allows the creator of a course to reuse existing content to create new or additional courses. In addition, the content structure provides flexible content delivery that may be adapted to the learning styles of different learners. This solution focusses on finding out the association between a learning objective and their associate content;

SUMMARY

Embodiments of the present disclosure present technological improvements as solutions to one or more of the above-mentioned technical problems recognized by the inventors in conventional systems. For example, in one embodiment, a content affinity analytics method and system are provided. The system performs analytics on learning content by capturing learning data from learning management systems into a relational database that is used as an intermediate data store. Further the incremental leaning data is filtered in, initiated by triggers in the intermediate data store, and is pushed into a data queue. From this data queue the learning data is transformed into graph form and stored into a graph database. The data is transformed in a way that the graph data is in the form of learning nodes. The learning nodes are represented as books, assignments, questions and learning objectives and relationships between these learning nodes are established.

On this learning data in graph form, an affinity analytics process is executed that establishes relationships representing the edges between learning nodes, wherein the relationship is based on the hierarchy of the learning nodes. Through this affinity analytics process affinity insights between the learning nodes are established, based on the number of relationships established between nodes and weightage arrived at on the edges between nodes. This establishes a readiness of the graph database for the invoker of a query to receive affinity data.

The system receives input data from a user in the form of questions, to which recommended affined cluster of questions are generated and sent back to the requester through a web interface.

The system also enables sending the comprehensive learning data across multiple learning management systems and user groups.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Some embodiments of this disclosure, illustrating all its features, will now be discussed in detail. The disclosed embodiments are merely exemplary of the disclosure, which may be embodied in various forms.

Before setting forth the detailed explanation, it is noted that all of the discussion below, regardless of the particular implementation being described, is exemplary in nature, rather than limiting. For example, although selected aspects, features, or components of the implementations are depicted as being stored in memories, all or part of the systems and methods consistent with the Content Affinity Analytics system and method may be stored on, distributed across, or read from other machine-readable media.

Figure 1:
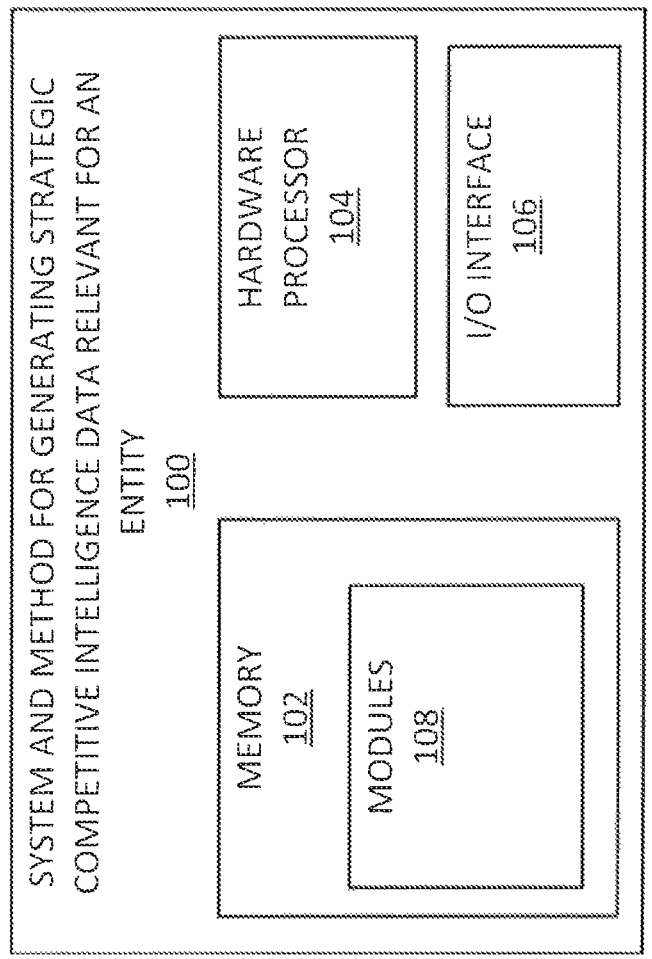
FIG. 1 is a block diagram of system for carrying out content affinity analytics according to some embodiments of the present disclosure.

FIG. 1 is a block diagram of a Content Affinity Analytics system 100 according to an embodiment of the present disclosure. The Content Affinity Analytics system 100 comprises a memory 102, a hardware processor 104, and an input/output (I/O) interface 106. The memory 102 further includes one or more modules 108 (or modules 108). The memory 102, the hardware processor 104, the input/output (I/O) interface 106, and/or the modules 108 may be coupled by a system bus or a similar mechanism.

The memory 102, may store instructions, any number of pieces of information, and data, used by a computer system, for example Content Affinity Analytics system 100 to implement the functions (or embodiments) of the present disclosure. The memory 102 may include for example, volatile memory and/or non volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 102 may be configured to store information, data, applications, instructions or the like for enabling the sensor data fusing system 100 to carry out various functions in accordance with various example embodiments.

The hardware processor 104 may be implemented as one or more microprocessors, microcomputers, microcontrollers, digital signal processors, central processing units, state machines, logic circuitries, and/or any devices that manipulate signals based on operational instructions. Further, the hardware processor 104 may comprise a multi-core architecture. Among other capabilities, the hardware processor 104 is configured to fetch and execute computer-readable instructions or modules stored in the memory 102.

Figure 8:
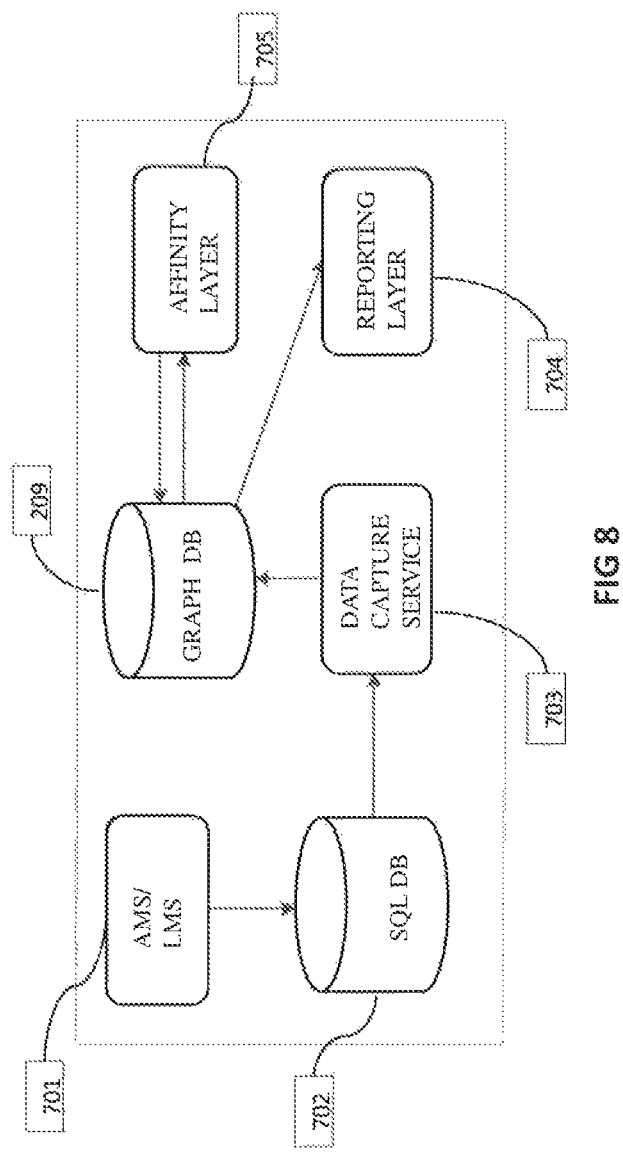
FIG. 8 is a representative system diagram of the overall content affinity analytics system starting from the data entering the RDBMS from learning/assessment management systems through transformation into graph form to storing in a graph database, and on to affinity analytics performed on the graph data and then reporting the recommendations to external systems, according to some embodiments of the present disclosure.

FIG. 8 depicts the overall schematic view of the system 100 wherein the AMS/LMS component 701 is responsible for execution of actual use cases of AMS/LMS. The component 701 helps educators to choose a book, create questions, group them into assignment and then serve to the students. The data for the AMS/LMS module is stored in 702 a traditional Entity-Relationship (ER) database depicted here as the SQL DB. The Data Capture Services Layer 703 AMS/LMS data is collected in real time, transformed into a Graph model and stored in a graph Database 209 depicted here as Graph DB. The Affinity Analytics Layer 705 is a once-daily batch process that analyses the data in the Graph DB 209 and executes the affinity algorithm that generates affinity data based on the contents of the Graph DB and stores the additional affinity data within the nodes and edges of the Graph DB. This arrangement has been made to eliminate the need for execution of the affinity algorithm during any online query, as the data volume is likely to be substantial thereby making the likelihood of a quick query turnaround unlikely. The Reporting Layer 704 is responsible for receiving input data from an invoker as questions, executing graph queries on the Graph DB based on the input and sending the data back to the invoker. In one embodiment the data may be sent as a JSON response to the invoker and REST service interfaces may be used for this data input and output.

Figure 2:
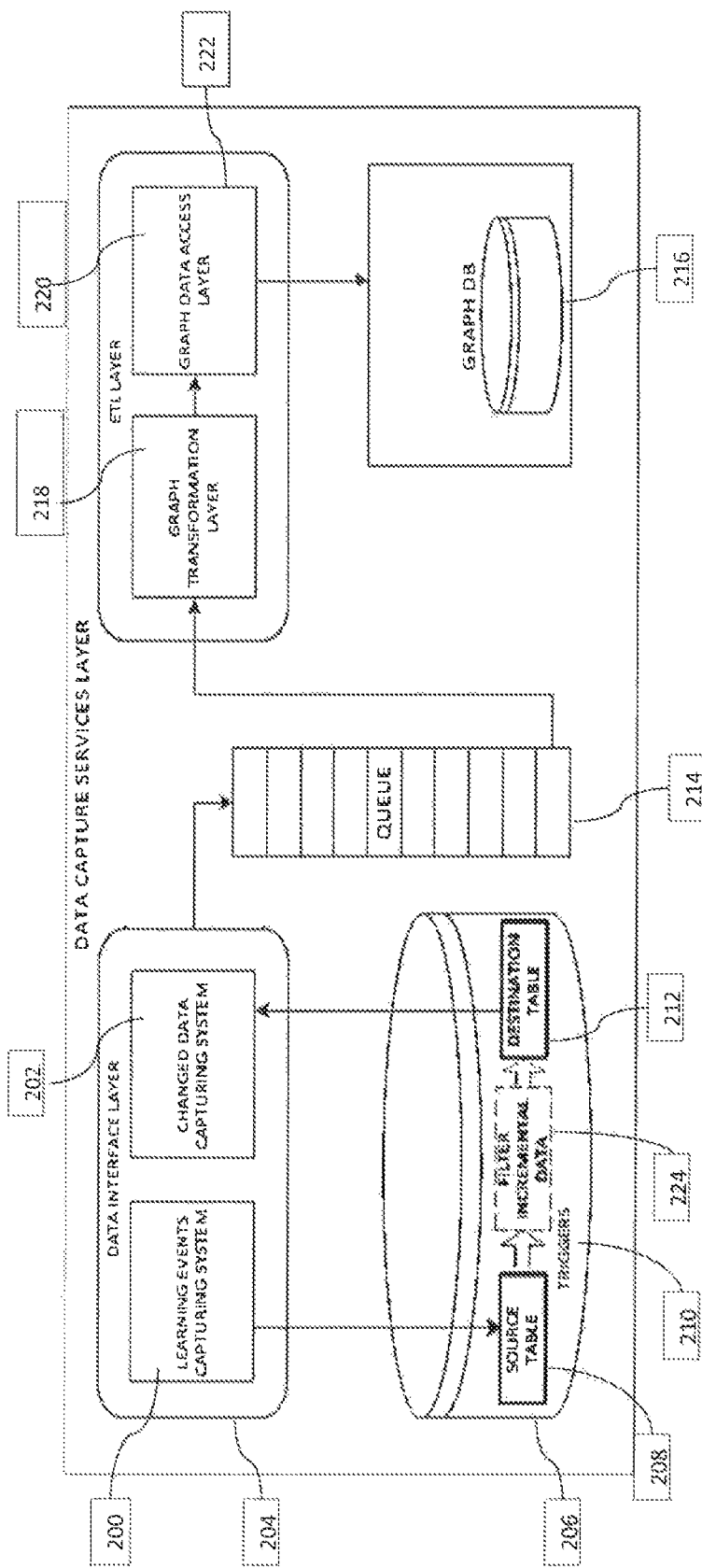
FIG. 2 is a representative system diagram for capturing learning data generated by users in learning management systems, storing them in a relational database, and then transforming them into graph form and subsequently storing them in a graph database, according to some embodiments of the present disclosure.

The Data Capture Service layer as depicted in FIG. 2 represents a method wherein real time data is collected from the SQL DB 209, transformed into Graph Entity-Relationship model and persists in the Graph DB 216. In one embodiment, use of techniques like Oracle Advanced Queue can guarantee that the insertion order is preserved and retrieval is done in order. In this embodiment Neo4J may be employed as the graph database, but technically any graph database may be implemented. Building the Affinity data using Graph DB is much more optimal than doing it using relational/No-SQL Tabular or document oriented structure. Retrieving data from the Graph DB 216 is a constant time operation. Affinity data can be rebuilt very quickly using Graph DB 216 and much more efficiently performing in nature than relational databases.

1. Steps are described here: The data interface 204 to the SQL DB 206 comprises of the Learning Events Capturing System 200 and the Changed Data Capturing System 202.
2. Instructors create/update assessment items and these are captured by a Learning Events Capturing System 200. These creation/updates result in learning events being generated which get persisted in the source table 208.
3. Triggers 210 are activated, that initiates a filtering module 224 to capture the incremental data and these are stored in the destination table 212.
4. Changed Data Capturing System 202 takes data from the Destination table 212 and puts in a queue 214. This arrangement is for the purpose of loosely coupling the Extract Transform Load (ETL) layer 222 from the original system comprising of the SQL DB 206 and data interface layer 204.
5. Graph transformation layer 218 reads data from the queue whenever data is available and transforms it into a graph data structure (that which can be stored in a Graph database).
6. Graph data access layer 220 then reads the graph data structure and stores it into the Graph DB 216.

Figure 3:
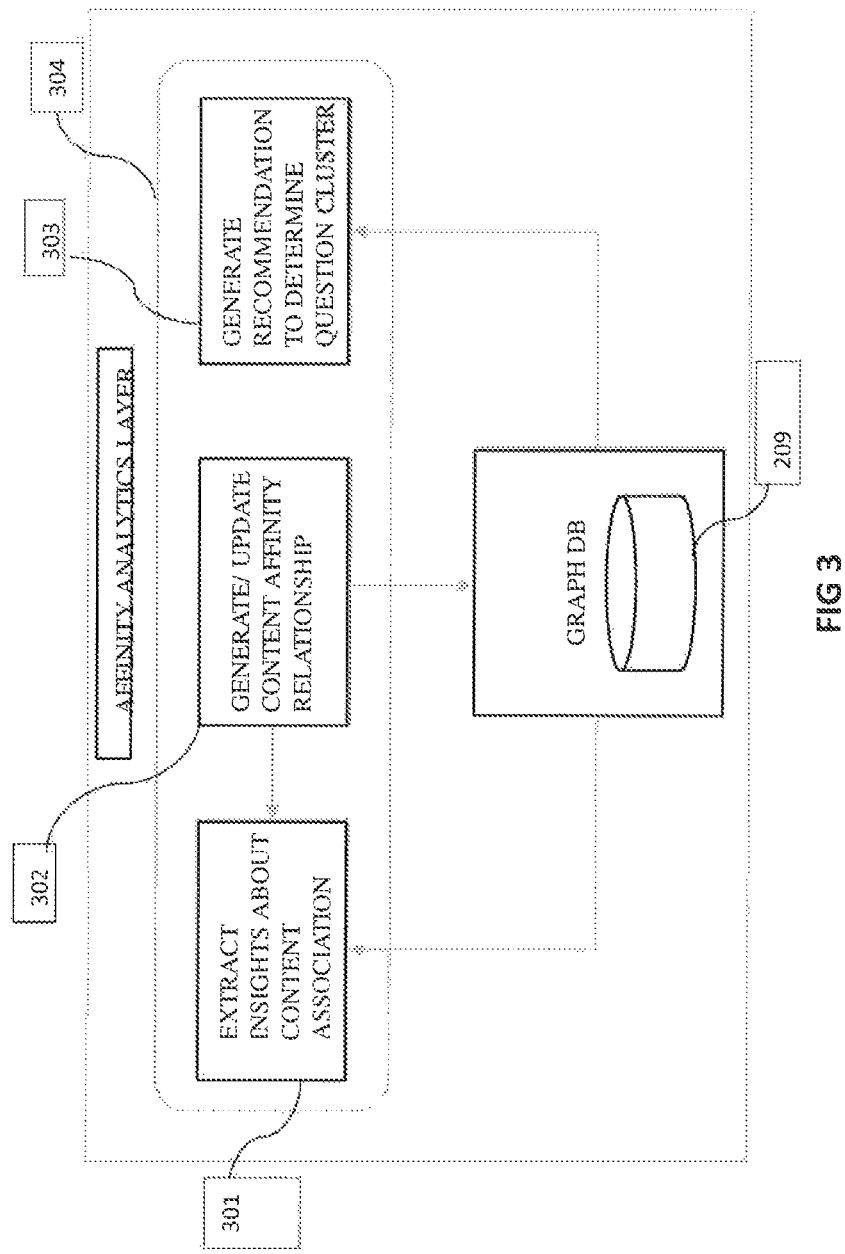
FIG. 3 is a representative system diagram for carrying out affinity analytics on the learning data stored in graph form in the graph database, storing them back into the said graph database and generating recommendations for question clusters, according to some embodiments of the present disclosure.

The Affinity Analytics Layer 304 as depicted in FIG. 3 is responsible for executing the affinity algorithm on the Graph DB 209 and to populate new relationships/attributes. This layer does the following steps:

1. Association discovery: Finds items that imply the presence of othercontent in the same category/event. A periodic batch runs in the Graph database which first extracts insights about content association 301.
2. Pattern discovery: Build affinity relationship between contents. It generates the affinity relationship and also computes the affinity weight of each newly created relationship 302.
3. Time sequence discovery: Finds patterns between events such that the presence of one set of items is followed by another set of items in a set of events over a period of time. It keeps on generating the recommendations based upon content selection and content affinity graph that eventually results in generation of recommendation to determine question cluster 303.

Figure 4:
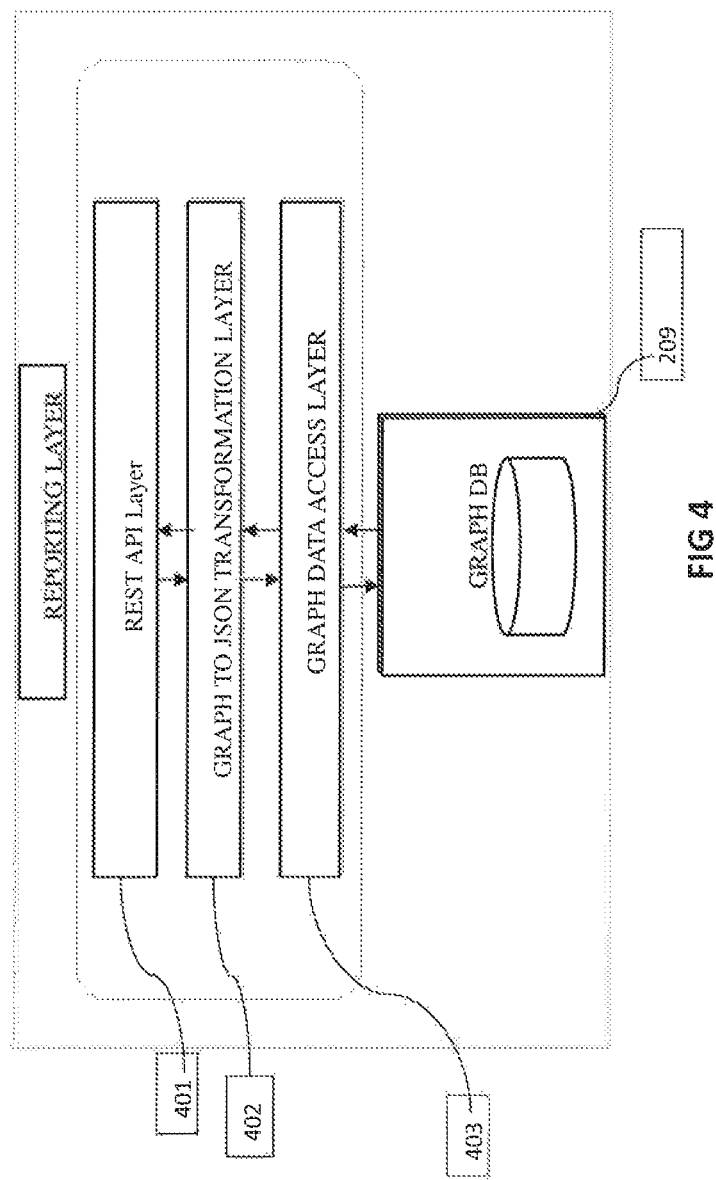
FIG. 4 is a representative system diagram for a data interface for the purpose of accepting inputs from an invoker and reporting the recommendations of the affinity analytics, according to some embodiments of the present disclosure.

The Reporting Layer as depicted in FIG. 4 is responsible for receiving input data from a human invoker through a web interface as questions, executing graph queries on the underlying graph database Graph DB 209 based on the input data, and for sending the resultant data as an affined group of questions back to the invoker again through the web interface. In one embodiment the data may be sent as a JSON response to the invoker and REST service interfaces may be used for this data interface and transfer.

Steps for the above mentioned embodiment are described here:

1. API Layer 401: REST API presents the graph data into JSON format
2. Transformation Layer 402: Transformation takes place to convert JSON to Graph and Graph to JSON
3. Data Access Layer 403: This layer interacts with the Graph database and fetches the necessary data.

Figure 5:
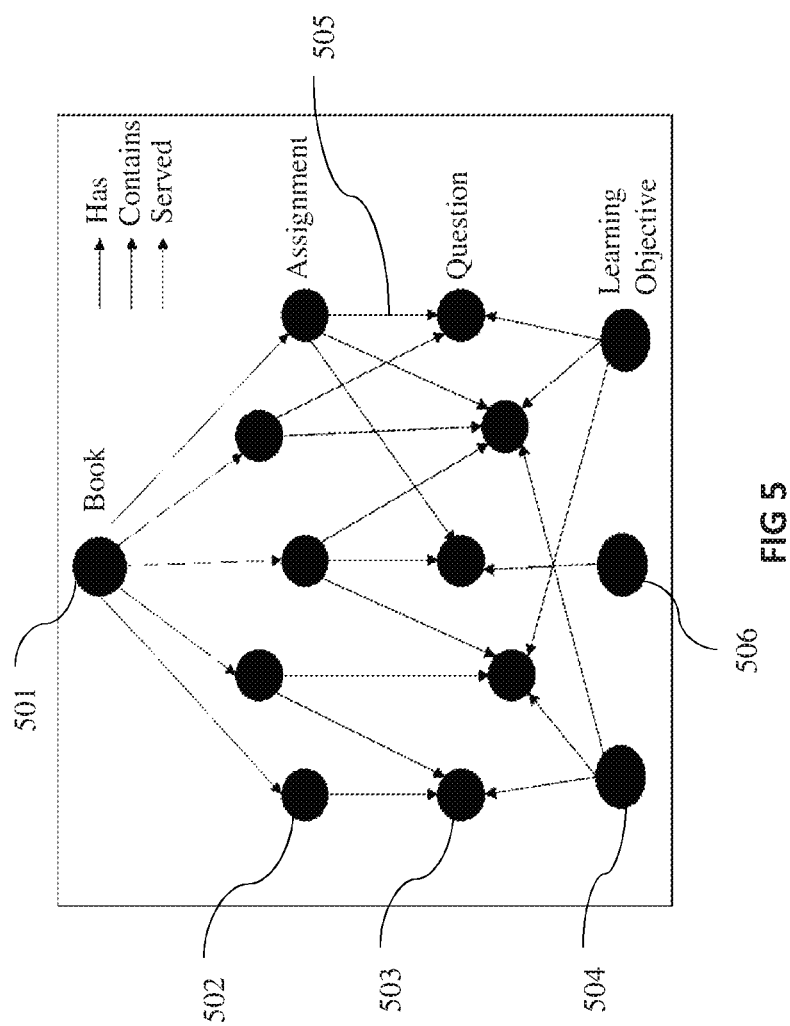
FIG. 5 is representative logical diagram for the organization of data in the graph database in the form of nodes representing books, assignments, questions and learning objectives and the relationships between them, according to some embodiments of the present disclosure.

The detailed method referred here to as Affinity Analysis as performed by the Affinity Analysis Layer 304, is depicted in FIG. 5 and is described here.

To generate an effective learning content, the historical data about the usage of the content is very important. Typically aggregation of learning content serves a learning plan. Usage history of the learning content as well as fitment history of the learning content within the learning plan is very important to generate affinity insights. In this invention, a graph model has been used to model the entity and the edge between the nodes is representing a relationship of those two entities. Any specific facts about this relationship are captured as attributes of the edge.

FIG. 5 shows a graphical model of the relationships that exist among the AMS entities. A Book 501 is a node and has some attributes like [Author, ISBN, Edition, Publication] and contains (or is associated with) different number of Assignments 502. An assignment 502 is nothing but an aggregation of questions 503 catering one learning objective 504. An Assignment node 502 has attributes like [Id, Title, Description, Start Date, End Date, Author_ID]. A question 503 is situated at the atomic level and is tagged to a Learning Objective 504 and it checks students' understanding of one particular learning objective 504 or multiple learning objectives. The attributes of question 503 are [Question Title, Question Weight, Question Source System, Question_ID]. A question 503 can be tagged to multiple learning objectives 504.

Figure 6:
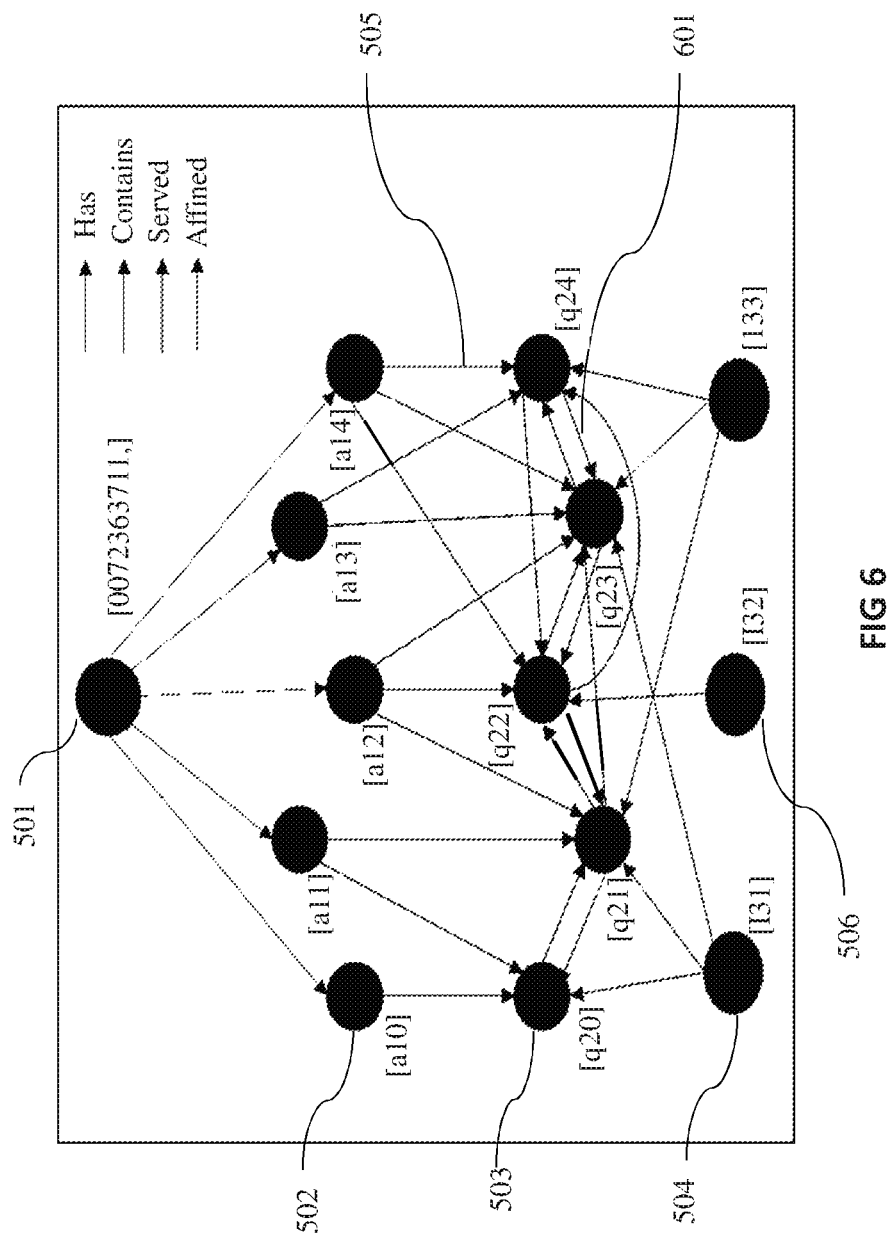
FIG. 6 is a representative logical diagram for the affinity analytics on the nodes of the graph representing books, assignments, questions and learning objectives, according to some embodiments of the present disclosure.

FIG. 6 shows an embodiment of a representative set where below relations are represented in the Graph Model, where a Book {0072363711} 501 is considered:

| Node [Attribute] | Relationship | Node |
| --- | --- | --- |
| Book [0072363711] | :[has] | {[a10], [a11], [a12], [a13], a[14]} |
| Assignment [a10] | :[contains] | {[q20]} |
| Assignment [a11] | :[contains] | {[q20], [q21]} |
| Assignment [a12] | :[contains] | {[q21], [q22], [q23]} |
| Assignment [a13] | :[contains] | {[q23], [q24]} |
| Assignment [a14] | :[contains] | {[q22], [q23], [q24]} |
| Learning Objective [l31] | :[serves] | {[q20], [q21], [q23]} |
| Learning Objective [l32] | :[serves] | {[q22]} |
| Learning Objective [l33] | :[serves] | {[q21], [q23], [q24]} |

Once this model is established, then it finds out what are the other questions that are associated in some Assignments 502 where the Question 503 is associated; which can be translated to below Graph Query Language:

Match [q']←:[contains]–[Assignment]–:[contains]→[q] where q!=q' return q; Entire graph has to be traversed for each Question node to generate such insights and a new relationship gets created between two such questions. FIG. 6 shows that by example.

Once the above mentioned relationship gets created between each question, it then provides the affinity of the questions 503. Now if any question 503 appears in more than one Assignment 502, then affinity weight gets increased by 1. In such a manner when the entire graph has been traversed and relationship gets updated, the graph will represent a connected "Affine graph" which has the data for recommendation, aggregation and all other different type of data. Below table shows the "Affine graph" for the above representative data:

| Question | Containing Assignments | Affined Questions | Weight |
|---|---|---|---|
| [q20] | {[a10], [a11]} | [q21] | 1 |
| [q21] | {[a11], [a12]} | [q20], [q22], [q23] | 1, 1, 2 |
| [q22] | {[a12], [a14]} | [q21], [q23], [q24] | 1, 1, 1 |
| [q23] | {[a12], [a13], [a14]} | [q21], [q22], [q24] | 1, 2, 2 |
| [q24] | {[a13], [a14]} | [q23] | 2 |

Figure 7:
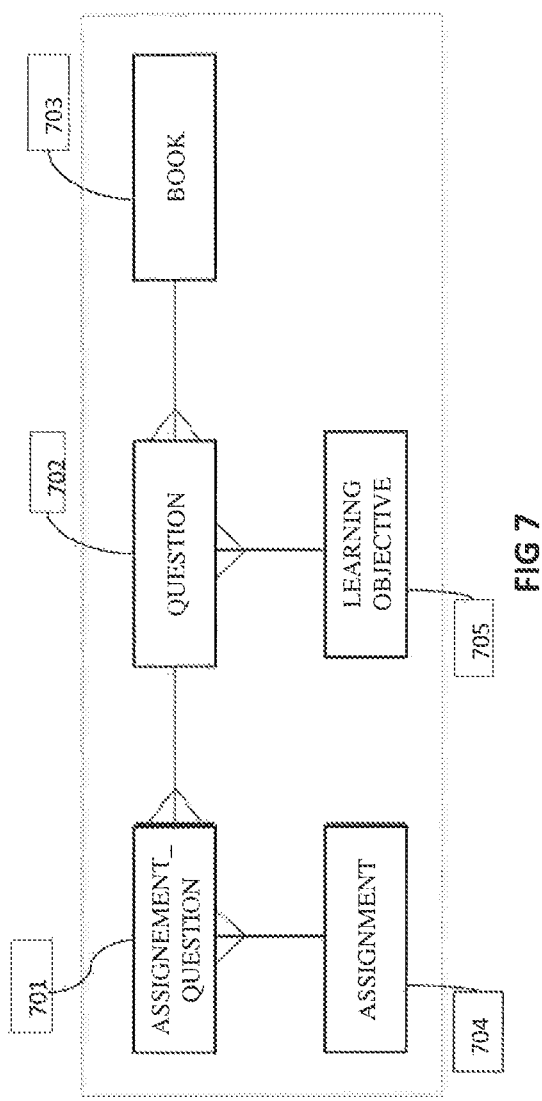
FIG. 7 is a representative block diagram of the entities books, assignments, questions and learning objectives and the relationships and cardinalities between them, according to some embodiments of the present disclosure.

If the learning nodes were to be maintained in a traditional Entity Relationship model it would be as depicted in FIG. 7. Here the relationship between Assignments 704 to Question 702 would be a many-to-many relationship as an Assignment can contain multiple Questions and a Question can be associated with multiple Assignments. This would then be implemented by an intermediate table 701 illustrated here by the name "Assignment_Question". This model has been used by traditional AMS/LMS systems.

Now in order to run such Affinity Analysis on this ER model, using the earlier embodiment, the below query needs to be executed:

```
Select
    q.question_id, q1.question_id
From
    Assignment ast, Assignment_Question aq, Question
    q1, Question q2
Where
        ast.assignment_id = aq.assignment_id
    AND ( aq.question_id = q1.question_id OR
    aq.question_id = q2.question_id)
    And q1.question_id != q2.question_id;
```

Typically in any AMS/LMS's production system, the run time complexity of the above query would be huge and any real time analytics cannot be run. Hence in order to do the Affinity Analysis of the above data, in an effective and yet an efficient way, the strategy of converting the data in traditional Entity-Relationship format into a Graph DB, as depicted in FIG. 8, was taken.

Below statistics gives the performance benefits of Graph over the traditional ER model:

Query response time=Function of (graph density, graph size, query degree)

Relational Database (RDBMS): Exponential slowdown as each factor increases

Graph DB (like Neo4j):
 a. performance remains constant as graph size increases,
 b. performance slowdown is linear or better as density & degree increase.

Here is an illustration of Graph DB like Neo4j performance with respect to an RDBMS like MySQL Sample social graph with around 1000 persons Average 50 friends per person Path coverage limited to depth 4

| Database | # of persons | Query time |
|---|---|---|
| MySQL | 1000 | 2000 ms |
| Neo4j | 1000 | 2 ms |
| Neo4j | 1,000,000 | 2 ms |

Graph Database is fundamentally very fast in executing "Arbitrary Path Query". For example, with reference to FIG. 6 and the nodes depicted within, consider a problem at hand which is to find out that which Questions 502 are associated with one Question [q20] for the below mentioned record set.

| Question | Affined Questions |
|---|---|
| [q20] | [q21] |
| [q21] | [q20], [q22], [q23] |
| [q22] | [q21], [q23], [q24] |
| [q23] | [q21], [q22], [q24] |
| [q24] | [q23] |

For RDBMS to scan this, the representation of the above data set needs to be like below:

| Question | Affined Questions |
|---|---|
| [q20] | [q21] |
| [q21] | [d20] |
| [q21] | [q22] |
| [q21] | [q23] |
| [q22] | [q21] |
| [q22] | [q23] |
| [q22] | [q24] |
| [q23] | [q21] |
| [q23] | [q22] |
| [q23] | [q24] |
| [q24] | [q23] |

Now the RDBMS has to scan the full table multiple time for each question whether it has any affined question for [q20]. So as the number of records grow, the scanning time also increases and resulting into exponential growth of the response time.

On the other hand, graph traversal always knows beforehand the walks which started or include node [q20] and hence it does not have to search the entire graph but it will just traverse the walks. Hence even if the number of peripheral nodes increases in the graph, the performance almost remains linear. So solving such category of problems, a Graph Database will always be helpful.

In one embodiment of the exchange of data across multiple AMS/LMS systems, extension of a Caliper framework to exchange Affinity Analytics data may be used. Currently the Caliper framework guides the exchange of only learning analytics data. However as Affinity Analytics data is a real new world of information, so there is a need to exchange this information as well within the Caliper framework.

Online learning environments and other learner activity data have traditionally been maintained and strengthened in silos thereby making it impossible for learners and educator alike to view or understand the wider picture and to get a holistic view of what is happening in the learning and teaching environment. This gave rise to the need to standardize and consolidate data for a single view and cross provider analysis.

In one embodiment for the above need for standardization, Learning Tools Interoperability (LTI) and Question and Test Interoperability (QTI) specifications enables connection of learning systems with external service tools in a standard framework and supports the exchange of item, test and results data between authoring and delivery systems in a learning management network of systems.

In the same embodiment as above the Caliper Framework helps establish a means to consistently capture and present measures of learning activity, define a common language for labelling learning data and provide a standard way of measuring learning activities and effectiveness.

Figure 9:
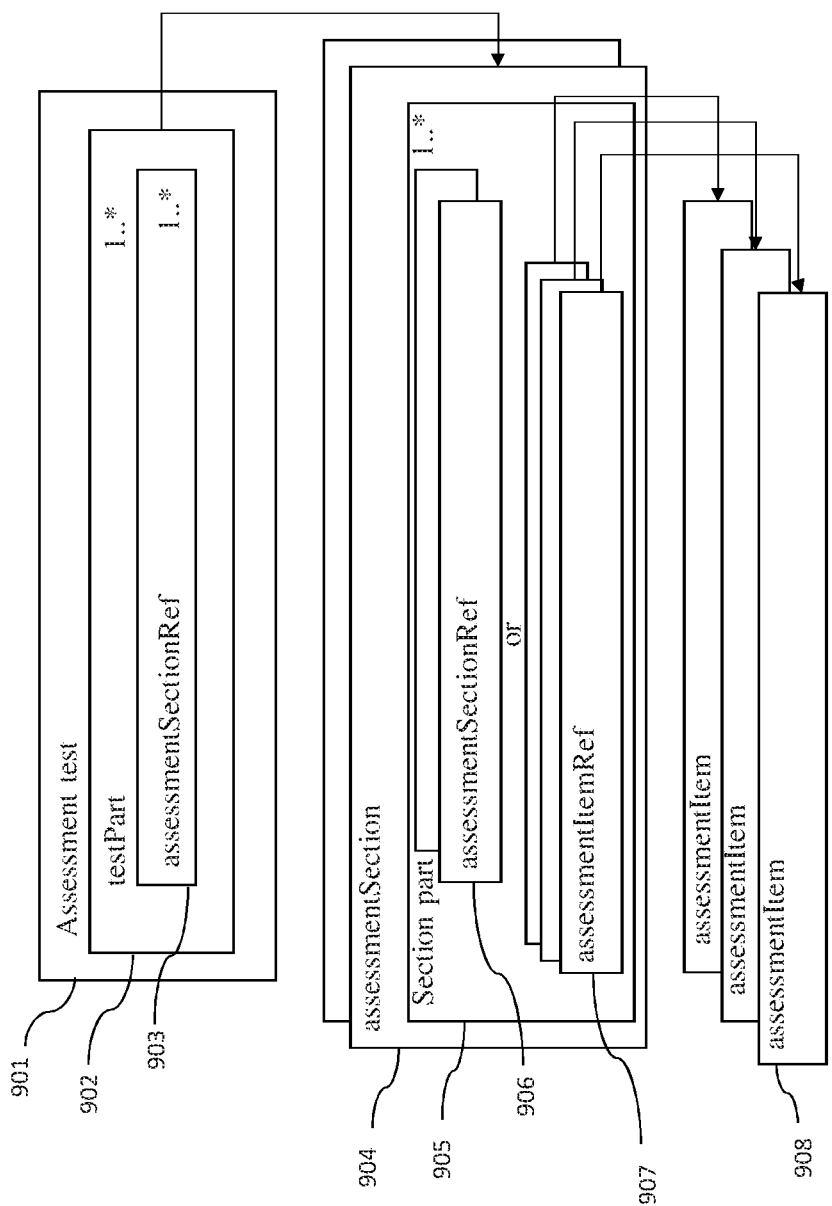
FIG. 9 is a representative block diagram of an embodiment of learning data exchange platform for data exchange across various learning and assessment systems, according to some embodiments of the present disclosure.

In one embodiment considering the above mentioned LTI, QTI and Caliper Framework, a standard QTI Package Schema is depicted in FIG. 9.

Figure 10:
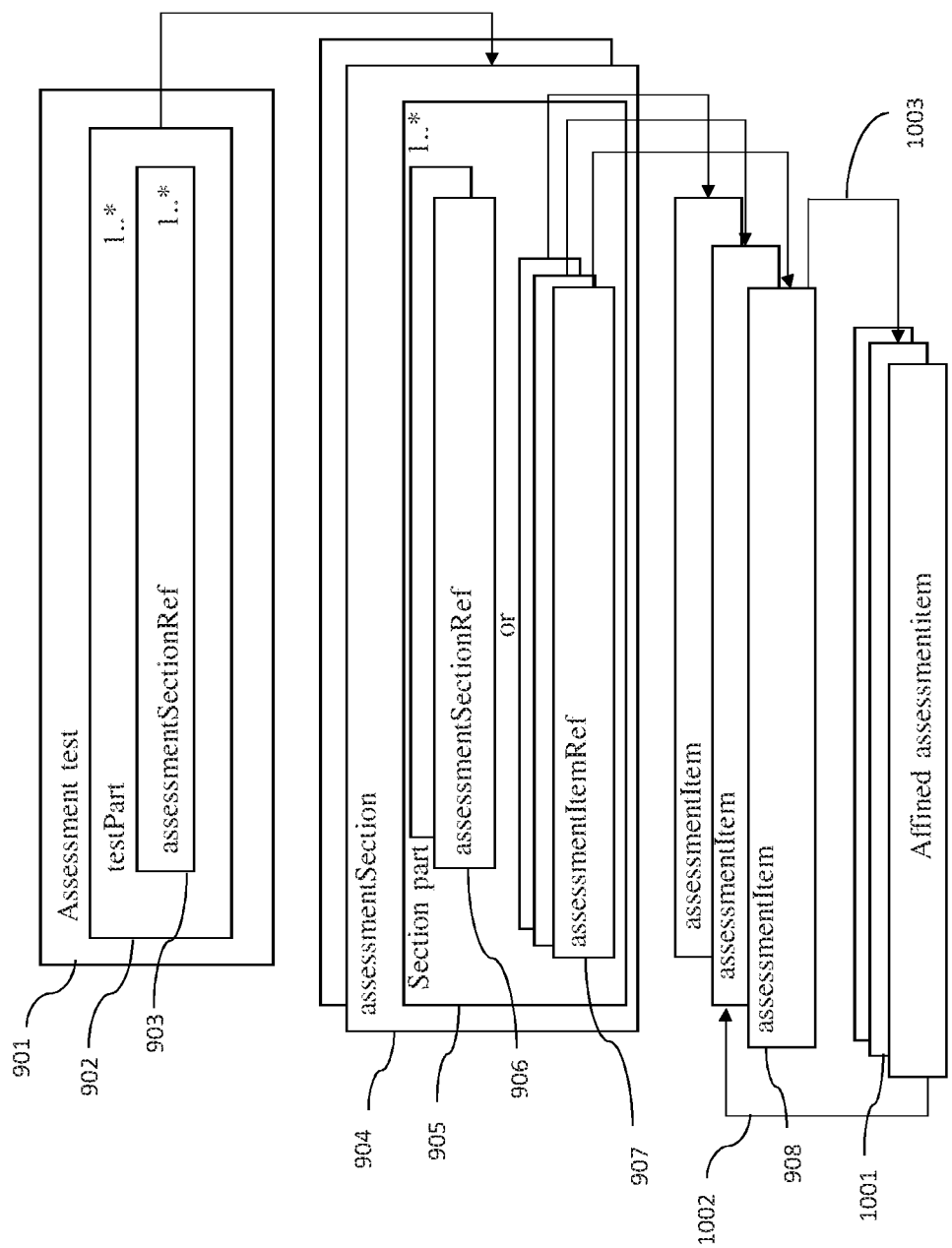
FIG. 10 is a representative block diagram of an embodiment of learning data exchange platform for data exchange across various learning and assessment systems that also includes affined assessment data and recommendations, according to some embodiments of the present disclosure.

In the proposed embodiment the QTI schema will be as depicted in FIG. 10 and illustrates how the Affinity Data would be housed inside it.

In this proposed embodiment, a collection of affined assessment items embodied here as "assessmentItem" collection 908 will be tagged to each of the assessment item references "assessmentItemRef" 907. The AffinedassignmentItem collection 1001 would have a pointer back to the original assessmentItem 908 so that data does not have to be duplicated. The "weight" and any additional attribute can be accommodated in the AffinedassignmentItem 1001 data structure. This would then help an existing Caliper framework to transport the affinity analytics data within the same QTI package.

Potential uses of this invention are as follows:
This will help all publishing & media customers as such analytics would be the backbone of their digital business. Following use cases would be valid for this:
Predicting question set for Instructors of a class teaching a specific subject area
Predicting learning path for students
Predicting set of PRs for a class/section
Predicting career options for students
Predicting reviewer for an scientific research paper for a Journal on a specific subject area
Predicting co-researchers for a scientific topic for a Journal Predicting target users of a new game launch
Predicting target audience/time for a new advertisement
Predicting best advertisement space in city/digital space Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A hardware processor implemented method for performing analytics on learning content, the method comprising:
populating learning data into a source table in a relational database used as an intermediate data store;
filtering incremental learning data coming into the source table;
storing the filtered incremental learning data into a destination table within the relational database, wherein the destination table stores only the incremental learning data;
capturing the incremental learning data from the destination table and push the captured incremental learning data into a data queue;
transforming the incremental learning data from said data queue to a graph form;
storing the incremental learning data in graph form into a graph database, wherein the graph database comprises learning nodes and edges between nodes;
performing association discovery, by an affinity analytics module, by running a periodic batch in the graph database to find items that imply the presence of content in the same category or event;
analyzing the learning data in the graph database to establish relationships representing the edges between learning nodes, wherein the relationship is based on the hierarchy of the learning nodes;
creating attributes and weights of the edge of relationships by establishing facts about the relationship between learning nodes;
generating affinity insight among the learning nodes based on a number of relationships established between the learning nodes and the weights arrived at the edges between the learning nodes, wherein the affinity insight among the learning nodes is generated by traversing the graph for each of the learning nodes, and wherein the affinity insight among the learning nodes is established via analysis of node relationships between adjacent nodes as well as between nodes related via other connected nodes;
determining, by the affinity analytics module, affinity of each of the learning nodes based on the associated affinity insight, updated relationship between each of two or more of the learning nodes, and the weights of the edge of relationships;
receiving an input data from a user;
generating a set of recommended questions based on the affine graph and input data and providing the set of recommended questions, wherein patterns between the events are found such that the presence of one set of items is followed by another set of items in a set of events over a period of time, and wherein the graph data is transformed and sent as a JavaScript Object Notation (JSON) response to the user; and
sending comprehensive learning data across multiple learning management systems.

2. The method of claim 1, wherein the learning data comprises learning nodes representing books, assignments, questions and learning objectives.

3. The method of claim 2, wherein the questions are texts that serve the purpose of establishing learning objectives comprising attributes Question Title, Question Weight, Question Source System and Question ID.

4. The method of claim 2, wherein the assignments are tasks or pieces of work allocated to someone as part of a course of study, and wherein measurement of assignments are achieved by a plurality of questions comprising attributes Assignment ID, Assignment Title, Assignment Description, Assignment Start Date, Assignment End Date and Assignment Author ID.

5. The method of claim 2, wherein the books are representations of subject matter described through a combination of textual representations, illustrations, audio, and video and comprising attributes Author, International Standard Book Number (ISBN), Edition and Publication.

6. The method of claim 1, wherein the input data from a user comprises selection of a question in a course context through a user interface within a Learning Management System.

7. The method of claim 1, further comprising sending the set of recommended questions based on affinity question graph and input data over a learning measurement framework for the purpose of sharing the additional learning data with multiple user groups.

8. A system for performing analytics on learning content, the system comprising:
a memory storing instructions;
a processor communicatively coupled to said memory, wherein the processor is configured by said instructions to:
populate learning data into a source table in a relational database used as an intermediate data store
filter incremental learning data coming into the source table;
store the filtered incremental learning data into a destination table within the relational database, wherein the destination table stores only the incremental learning data;
capture the incremental learning data from the destination table and push the captured incremental learning data into a data queue;
transform the incremental learning data from said data queue to a graph form;
store the incremental learning data in graph form into a graph database, wherein the graph database comprises learning nodes and edges between nodes;
perform association discovery, by an affinity analytics module, by running a periodic batch in the graph database to find items that imply the presence of content in the same category or event;
analyze the learning data in the graph database to establish relationships representing the edges between learning nodes, wherein the relationship is based on the hierarchy of the learning nodes;
create attributes and weights of the edge of relationships by establishing facts about the relationship between learning nodes;
generate affinity insight among the learning nodes, based on a number of relationships established between the learning nodes and the weights arrived at the edges between the learning nodes, wherein the affinity insight among the learning nodes is generated by traversing the graph for each of the learning nodes, and wherein the affinity insight among the learning nodes is established via analysis of node relationships between adjacent nodes as well as between nodes related via other connected nodes;
determine affinity of each of the learning nodes based on the associated affinity insight, updated relationship between each of two or more of the learning nodes, and the weights of the edge of relationships;
receive an input data from a user;
generate a set of recommended questions based on the affine graph and input data and provide the set of recommended questions, wherein patterns between the events are found such that the presence of one set of items is followed by another set of items in a set of events over a period of time, and wherein the graph data is transformed and sent as a JavaScript Object Notation (JSON) response to the user; and
send comprehensive learning data across multiple learning management systems.

9. The system of claim 8, wherein the learning data comprises learning nodes representing books, assignments, questions and learning objectives.

10. The system of claim 9, wherein the questions are texts that serve the purpose of establishing learning objectives comprising attributes Question Title, Question Weight, Question Source System and Question ID.

11. The system of claim 9, wherein the assignments are tasks or pieces of work allocated to someone as part of a course of study, and wherein measurement of assignments are achieved by a plurality of questions comprising attributes Assignment ID, Assignment Title, Assignment Description, Assignment Start Date, Assignment End Date and Assignment Author ID.

12. The system of claim 9, wherein the books are representations of subject matter described through a combination of textual representations, illustrations, audio, and video and comprising of attributes Author, International Standard Book Number (ISBN), Edition and Publication.

13. The system of claim 8, wherein the input data from a user comprises selection of a question in a course context through a user interface within a Learning Management System.

14. The system of claim 8, wherein the processor is further configured by said instructions to send the set of recommended questions based on affinity question graph and input data over a learning measurement framework for the purpose of sharing the additional learning data with multiple user groups.

15. A non-transitory computer readable medium embodying a program executable in a computing device for performing analytics on learning content, the program comprising:
a program code for populating learning data into a source table in a relational database used as an intermediate data store;
filtering incremental learning data coming into the source table;
storing the filtered incremental learning data into a destination table within the relational database, wherein the destination table stores only the incremental learning data;
capturing the incremental learning data from the destination table and push the captured incremental learning data into a data queue;
transforming the incremental learning data from said data queue to a graph form;

storing the incremental learning data in graph form into a graph database, wherein the graph database comprises learning nodes and edges between nodes;

performing association discovery, by an affinity analytics module, by running a periodic batch in the graph database to find items that imply the presence of content in the same category or event;

analyzing the learning data in the graph database to establish relationships representing the edges between learning nodes, wherein the relationship is based on the hierarchy of the learning nodes;

creating attributes and weights of the edge of relationships by establishing facts about the relationship between learning nodes;

generating affinity insight among the learning nodes based on a number of relationships established between the learning nodes and the weights arrived at the edges between the learning nodes, wherein the affinity insight among the learning nodes is generated by traversing the graph for each of the learning nodes, and wherein the affinity insight among the learning nodes is established via analysis of node relationships between adjacent nodes as well as between nodes related via other connected nodes;

determining, by the affinity analytics module, affinity of each of the learning nodes based on the associated affinity insight, updated relationship between each of two or more of the learning nodes, and the weights of the edge of relationships;

receiving an input data from a user;

generating a set of recommended questions based on the affine graph and input data and providing the set of recommended questions, wherein patterns between the events are found such that the presence of one set of items is followed by another set of items in a set of events over a period of time, and wherein the graph data is transformed and sent as a JavaScript Object Notation (JSON) response to the user; and sending comprehensive learning data across multiple learning management systems.

\* \* \* \* \*